United States Patent [19]

Rickson

[11] Patent Number: 4,863,282
[45] Date of Patent: Sep. 5, 1989

[54] SUN HEAT RADIATION SENSOR

[75] Inventor: Colin D. Rickson, Woburn Sands, United Kingdom

[73] Assignee: Liquid Crystal Devices Limited, Ruislip, United Kingdom

[21] Appl. No.: 141,068

[22] Filed: Jan. 5, 1988

[30] Foreign Application Priority Data

Jan. 13, 1987 [GB] United Kingdom ............... 8700690

[51] Int. Cl.$^4$ .............................................. G01J 1/50
[52] U.S. Cl. .................................... 374/162; 250/372
[58] Field of Search ................. 374/161, 162; 250/372

[56] References Cited

U.S. PATENT DOCUMENTS

| | | | |
|---|---|---|---|
| 3,590,772 | 7/1971 | Boone | 250/372 X |
| 3,864,976 | 2/1975 | Parker | 374/161 |
| 3,903,423 | 9/1975 | Zweig | |
| 3,917,948 | 11/1975 | Strutz | 250/372 |
| 3,967,124 | 6/1976 | Strutz | 250/372 |
| 4,140,016 | 2/1979 | Fergason | 350/351 X |
| 4,212,535 | 7/1980 | Sanders et al. | |
| 4,688,901 | 8/1987 | Albert | 350/351 X |
| 4,738,549 | 4/1988 | Plimpton | 374/161 X |
| 4,749,865 | 6/1988 | Scheller | 250/372 X |

FOREIGN PATENT DOCUMENTS 0046158 2/1982 European Pat. Off. .
0685465 11/1939 Fed. Rep. of Germany .

Primary Examiner—Daniel M. Yasich
Attorney, Agent, or Firm—Michael J. Striker

[57] ABSTRACT

A sun heat radiation sensor is provided having a plurality of display areas each of which comprises a different, heat activatable liquid crystal composition. The liquid crystal compositions are selected so that the display areas provide a quantitative visual indication of the sun heat radiation sensed by the sensor. The sensor may be applied to a container for sun-screening substances, e.g. typically to a lid of the container.

12 Claims, 5 Drawing Sheets

<30°C 30-40°C 40-45°C 45-50 °C 50-55 °C 55-65 °C 65-75 °C 75-85 °C

>85 °C

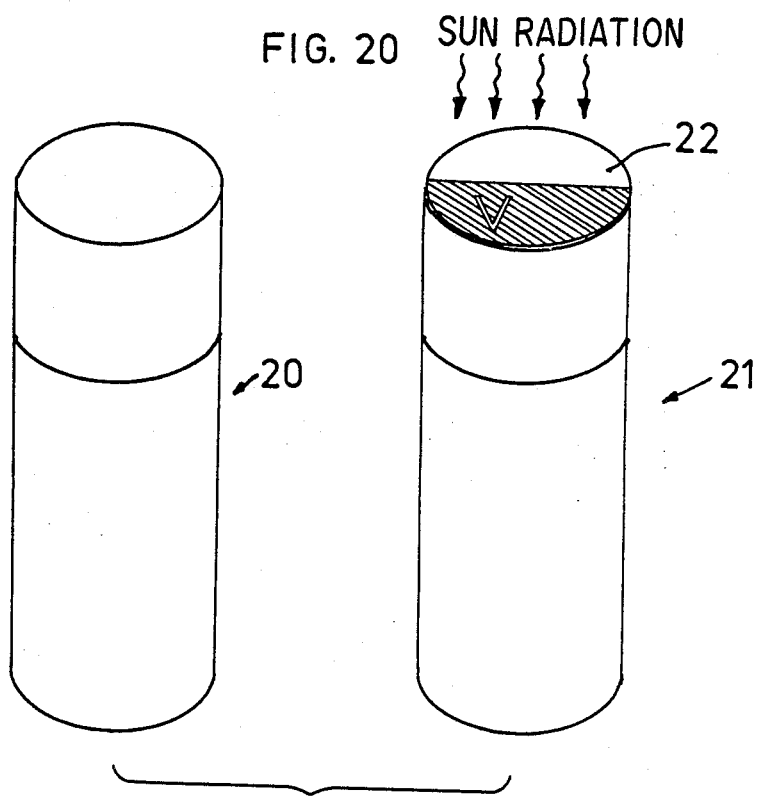

SUN HEAT RADIATION SENSOR

BACKGROUND OF THE INVENTION

This invention relates to a device for providing a visual indication of the heat or infrared radiation received from the sun. In particular, but not exclusively, the invention relates to a sun tan factor meter for providing a quantitative measure of the sun tanning power of the sun at any given time.

Electromagnetic radiation emitted by the sun covers a wide range of the spectrum. However a spectrum analysis of the emitted electromagnetic radiation shows that, on a clear day with little or no filtering cloud cover, there is a precise relationship between the proportion of ultra violet (U.V.) radiation emitted and the proportion of infra red (I.R.) radiation emitted. Thus a measurement of the temperature of a body heated by the sun (i.e. heated almost entirely by the I.R. radiation of the sun) will give a proportionate measurement of the U.V. radiation emitted by the sun on that body. Since the "burning" or sun tanning of the skin is caused, on the whole, by U.V. radiation emitted by the sun, it will be appreciated that measurement of the heat radiation from the sun received by a body can be used to provide an accurate measurement of the strength of the u.v. radiation from the sun.

It is known to provide complicated and expensive devices which electronically sense the temperature of solar radiation. It is also know to provide devices employing liquid crystal compositions which display temperatures over relatively narrow ranges—e.g. from 35° C. to 40° C. for a fever scope or from 10° C. to 40° C. for a room thermometer. Finally it is also known from U.S. Pat. No. 3,829,980 to provide a lid of a container for spraying sun tanning lotion with a device for assisting the user of the lotion. In this latter case the device is a gnomon of a sun dial for converting the lid into a sun dial so that the length of time a user is exposed to the sun can be measured.

None of the known devices provide a relaitively cheap device for providing an indiction of the strength of the heat radiation from the sun—e.g. to assess the sun-tanning power of the sun.

SUMMARY OF THE INVENTION

An aim of the present invention is to provide a relatively cheap device capable of measuring the heat or infrared radiation received from the sun. Typically, but not necessarily exclusively, this information is used to provide an indication of the sun-tanning power of the sun.

According to one aspect of the present invention there is provided a device for providing a visual indication of the amount of heat radiation received from the sun at any time, the device comprising carrier means and a plurality of display areas on the carrier means each comprising a different, heat dose activatable liquid crystal composition arranged to receive heat radiation from the sun, characterised in that the liquid crystal compositions are selected to be activated in response to different relatively narrow temperature ranges within a wide temperature range that the liquid crystal compositions would be expected to be heated to when the device is exposed to heat radiation from the sun, whereby a quantitative visual indication of the amount of heat radiation being received from the sun at any time is provided by the change in appearance of the display areas in dependence on the temperature that each liquid crystal composition is heated to by the sun within said wide temperature range.

The device may include at least one filter for filtering the sun radiation. For example, the device may include a U.V. filter to prevent or reduce degration of the liquid crystal composition by U.V. radiation. The device may also include a filter to obscure some, but not all, heat frequency bands of the heat radiation from the sun. However the use of such an I.R. or heat radiation filter is not preferred. The reason for this is that, in use of the device on a sunny day, the thermochromic liquid crystal compositions will be heated both by the ambient air temperature and by the heat radiation from the sun. When the heat radiation from the sun is not blocked or filtered it will normally be capable of heating the liquid crystal compositions to far higher temperatures than the ambient air. In order to minimize the effect of the ambient air temperature on the activation of the liquid crystal compositions, it is therefore preferable not to provide the device with an I.R. or heat radiation filter. In this preferred case, the thermochromic liquid crystal compositions are preferably selected so that said wide temperature range includes the range from at least 25° C., e.g. 30° C., to at least 80° C., e.g. 90° C., and is preferably at least 50° C., e.g. 60° C., wide.

Conveniently the liquid crystal compositions are arranged to be heated relatively quickly when exposed to heat radiation from the sun—i.e. the compositions have a low "thermal inertia". In practice this is achieved by employing thin layers of the liquid crystal compositions. For example microencapsulated inks of the thermochromic liquid crystal compositions may be printed in layers of less than 25 $\mu$m, e.g. 15 $\mu$m.

Preferably the thermochromic liquid crystal compositions employed have a low temperature dependence of colour but have different clearing points, the liquid crystal compositions displaying substantially the same colour (e.g. light green), when viewed in sunlight and when at temperatures below their respective clearing points. By careful design, the thermochromic liquid crystal compositions may be applied, e.g. printed, and selected in such a manner as to display a sun screening "factor" for different intensities of heat radiation sensed. In this respect, skin-applicable sun-screening substances (i.e sun tan lotions, oils, creams, etc.) normally have a numerical sun-screening protection factor ranging from 1 up to 16 (although in the United Kingdom the range is generally from 1 to 8), the higher the factor, the greater the filtering or sun-screening power of the sun-screening substance. Conveniently, therefore, the device may be designed to display different "factor" numbers over different narrow temperature ranges within said wide temperature range in dependence on the heat radiation sensed from the sun.

In conjunction with liquid crystals having various colour/temperature responses the background to the device can be of a colour to influence the thermal efficiency of the system, e.g. black for a high absorber and grey for a low absorber. The system can therefore be tuned for various background/liquid crystal formulations as a function of heat radiation sensed from the sun.

According to another aspect of the present invention there is provided a sun tan factor meter for measuring the heat radiation received from the sun comprising a number of different thermochromic liquid crystal compositions arranged to receive heat radiation from the sun and selected to display different sun tan factor numbers for different intensities of heat radiation received from the sun.

According to a further aspect of the present invention there is provided a container for skin-applicable sunscreening substances in combination with a sun tan factor meter according to said another aspect of the present invention.

Preferably the sun tan factor meter is applied to the container. In the case of the container having a lid or cap (i.e. when the container is a bottle or aerosol-type container), the sun tan factor meter is suitably applied thereto.

According to a still further aspect of the present invention there is provided in combination a first container containing sun screening lotion in concentrated form, a second container containing a diluent for diluting the concentration of the concentrated sun screening lotion to enable adjustment of the sun tan factor number thereof to the sun tan factor meter according to the invention. The sun tan factor number of the sun screening lotion can thus be adjusted, by mixing the correct proportions of the contents of the two containers, in dependence on the strength of the heat radiation from the sun sensed by the sun tan factor meter.

BRIEF DESCRIPTION OF THE DRAWINGS

Embodiments of the invention will now be described, by way of example, with reference to the accompanying drawings, in which

FIG. 20 is a perspective view of two containers, one containing a sun-screening lotion in concentrated form and the other containing a diluent for diluting the concentrate and provided with a sun tan factor meter on its lid.

DESCRIPTION OF THE PREFERRED EMBODIMENTS

Figure 1:
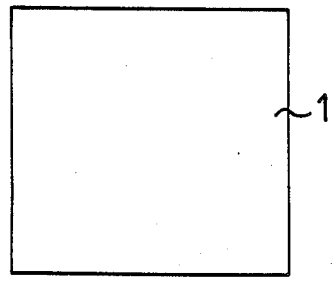
FIG. 1 is a view of a light absorbing carrier for backing different display areas of a sun factor meter.
Figure 2:
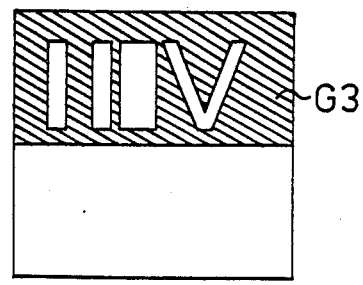
FIGS. 2 to 9 are schematic views showing the various layers of different thermochromic liquid crystal compositions arranged in front of a light absorbing layer, illustrated in FIG. 1, of a sun tan factor meter according to the invention.
Figure 3:
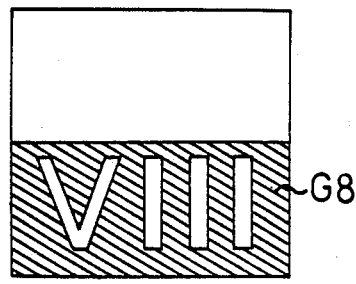
Figure 4:
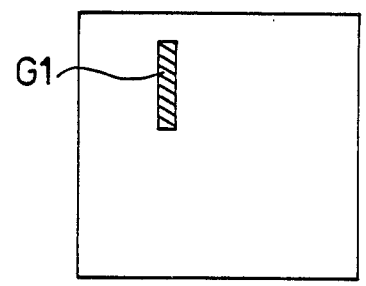
Figure 5:
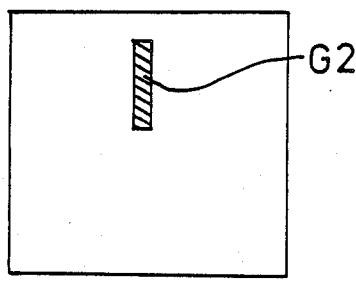
Figure 6:
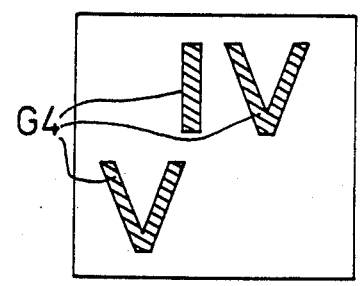
Figure 7:
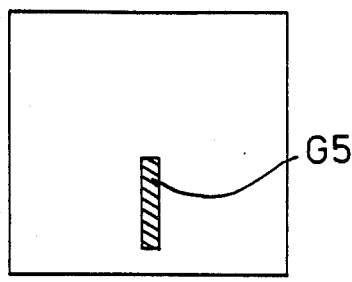
Figure 8:
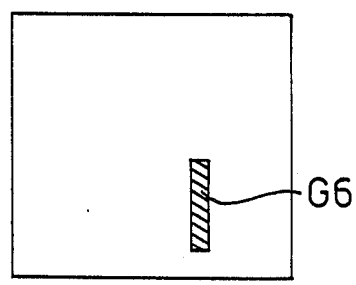
Figure 9:
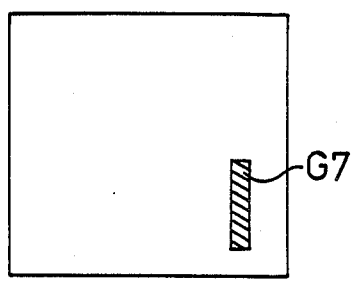
Figure 10:
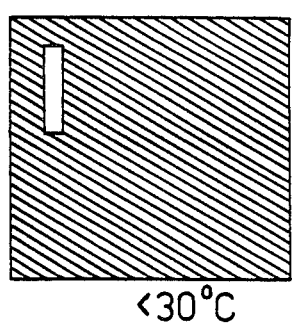
FIGS. 10 to 18 are schematic views illustrating the different displays of the sun tan factor meter at different operating temperatures.
Figure 11:
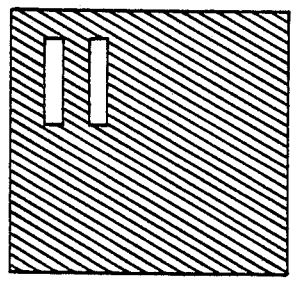
Figure 12:
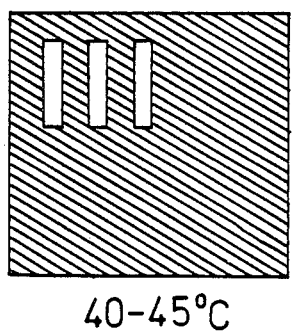
Figure 13:
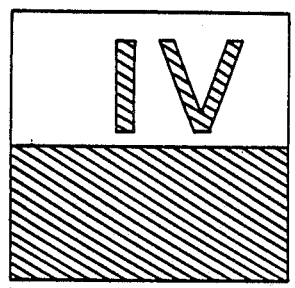
Figure 14:
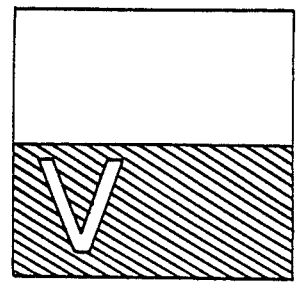
Figure 15:
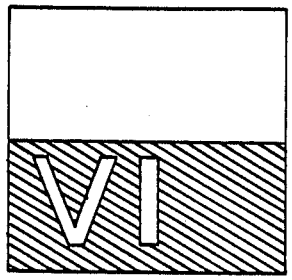
Figure 16:
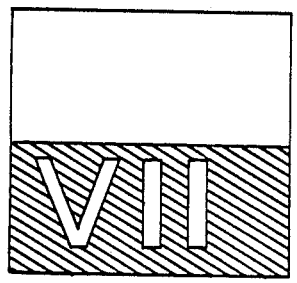
Figure 17:
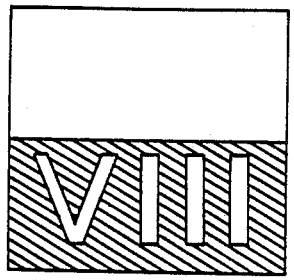
Figure 18:
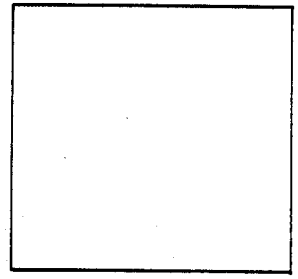

A sun tan factor meter according to the invention is made by printing a plurality of different thermochromic liquid crystal compositions onto a light absorbing, e.g. black, backing or carrier 1 (see FIG. 1) of sheet material, such as PVC film, polyester, heavily plasticised PVC (cling film) or paper. A protective transparent front covering layer (not shown), e.g. of PVC film, is then applied over the printed carrier 1. Alternatively, the liquid crystal compositions may be printed onto the inner surface of the front covering layer and a light absorbing layer, e.g. of black ink, printed over these liquid crystal compositions. A backing layer is then adhered to the printed surface of the front covering layer.

The thermochromic liquid crystal compositions are characterised by having different "clearing points" and by having a low temperature dependence of colour—i.e. they display a small variation of their iridescence with temperature and appear virtually the same colour, e.g. light green, when viewed in incident white light, over a wide temperature range immediately below their respective "clearing points". Thermochromic liquid crystal compositions having a low temperature dependence of colour are described in an article by Dr. D. G. McDonnell entitled "Thermochromic Liquid Crystals" published by BDH Chemicals Limited. Such a composition can be prepared by mixing liquid crystal compounds. For example, the composition may comprise a mixture of chiral nematic liquid crystal compounds mixed in proportions to adjust the clearing point of the composition and a nematic liquid crystal compound mixed in a proportion to adjust the colour of the composition in its cholesteric phase. Typically the chiral nematic liquid crystal compounds comprise TM74 and TM75 (available from BDH Chemicals Limited), and the nematic liquid crystal compound comprises ME35 (also available from BDH Chemicals Limited). The "clearing point" of a thermochromic liquid crystal composition is the temperature at which the liquid crystal composition undergoes the transition from a liquid crystal phase, e.g. the cholesteric phase, to the isotropic state. However, it will be appreciated that other liquid crystal types, e.g. cholesteric formulations, may be used instead of chiral nematics.

The thermochromic liquid crystal compositions are microencapsulated and applied as "inks" in a number of printing operations. FIGS. 2 to 9 show a typical sequence of overprinting operations in which the compositions G1–G9 are printed in thin layers, e.g. below 20 μm thick onto a light absorbing backing. However, as previously mentioned, the compositions can be printed in the reverse order and in mirror images of the designs shown in FIGS. 2 to 9, directly onto a transparent front sheet, e.g. of plastics material. In this case the light absorbing backing layer would be printed over the liquid crystal compositions in a final printing operation. By way of example, the various thermochromic liquid crystal compositions have the following clearing points:

| Composition | Clearing Point |
| --- | --- |
| G1 | 30° C. |
| G2 | 40° C. |
| G3 | 45° C. |
| G4 | 50° C. |
| G5 | 55° C. |
| G6 | 65° C. |
| G7 | 75° C. |
| G8 | 85° C. |

The completed sun tan factor meter is comparatively thin and has a low thermal inertia.

FIGS. 10 to 18 illustrate the various displays that the meter is capable of displaying when exposed to direct sunlight. The heat radiation from the sun heats the various thermochromic liquid crystal compositions arranged on carrier 1 in layers having the form of Roman numerals and, as the various clearing points are passed through, corresponding Roman numerals (from I to VIII) are displayed. Thus if the strength of the sun is sufficient to heat the meter to the temperature of 43° C., for example the meter will rapidly switch from displaying black numeral "I", then "II" and finally "III" against a completely light green background as the liquid crystal compositions are heated by the sun. Since the layers of the thermochromic liquid crystal compositions are thin, and have low thermal inertia, the numeral "III" will be displayed in a relatively short length of the time as the various clearing points are passed through.

If the meter is heated in excess of the clearing point of G3, e.g. to 48° C., the transition through the G3 clearing point will result in the top half of the display switching from a light green background to a black background and the numeral "IV" being displayed in light green.

The particular numeral "I" to "VIII" that is displayed when the meter is exposed to heat radiation from the sun, gives a quantitative indication of the strength of the sun. In particular the numeral displayed gives an approximate indication of the "strength" or "factor" number of skin-contacting sun-screening material (e.g. sun tan lotion, cream, foam or oil) that it is advisable to use to cover the skin in any particular sun condition.

Of course it will be appreciated that the meter described measures only I.R. or heat radiation from the sun. However there is a direct relationship between the i.r. and u.v. radiation emitted from the sun, and thus sensing of the I.R. radiation received from the sun provides a fairly accurate measurement of the sun-tanning power (basically due to the U.V. radiation) of the sun.

Since u.v. radiation degrades thermochromic liquid crystal compositions, a U.V. radiation filter (not shown) may be applied as a protective layer over the printed liquid crystal compositions.

The particular meter described above with reference to the drawings is quite sophisticated since it "switches" to give different displays at eight different temperatures. However less sophisticated meters may be designed having fewer, e.g. three, different types of thermochromic liquid crystal compositions typically having clearing point of 30° C., 40° C. and 60° C. Alternatively more sophisticated meters can be designed having more than eight different thermochromic liquid crystal compositions.

Figure 19:
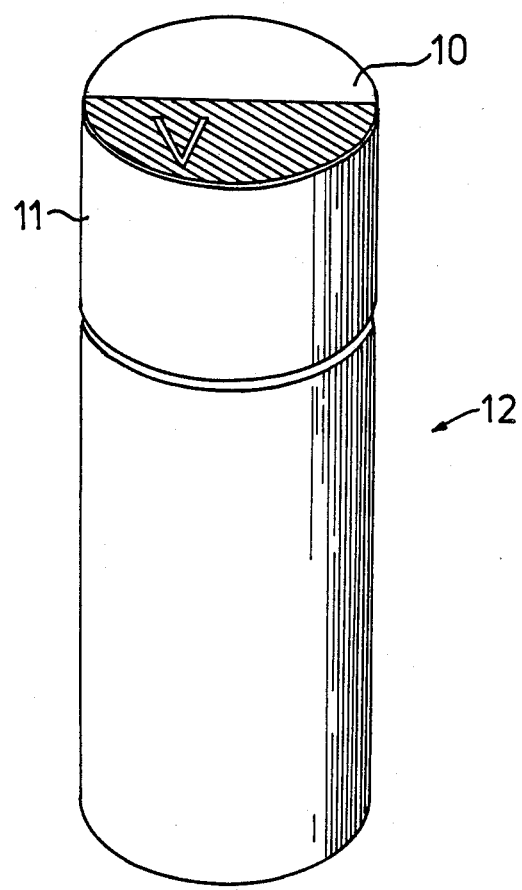
FIG. 19 is a perspective view of a container for a skin-applicable sun-screening substance having a sun tan factor meter on its lid.

The meter described above may be used in conjunction with a container for a skin-contacting sun-screening substance. For example the meter may be applied, e.g. adhesive carrier means, to an outer surface of the container—such as, for example, a container top (e.g. a screw-top of a bottle or a snap-on lid of an aerosol container). In such an application, a fairly basic meter, e.g. only displaying three "factors", would typically be employed although, of course, more sophisticated meters could be employed. FIG. 19 shows a sun tan factor meter 10 adhered to a snap-on lid 11 of an aerosol, spray or foam container 12 containing a sun-screening substance.

In another application a sun tan factor meter may form part of a cosmetic kit for enabling a user to prepare his or her own strength or "factor" number of skin-applicable sun-screening material. For example the kit might include a first bottle 20 (see FIG. 20) containing sun-screening lotion in a concentrated form and a second bottle 21 containing a diluent. Contents of the two bottles would be mixed together in the desired proportions to produce a sun-screening lotion of the desired "factor" number based on a measurement of the strength of heat radiation from the sun by a sun tan factor meter 22. In FIG. 20, the meter 22 is shown applied to the lid of bottle 21, although it could, of course, be attached to the lid of bottle 20 or be separate from the two bottles. The sun radiation is indicated by wavy arrows.

The invention has been described almost exclusively in relation to the application as a sun tan factor meter. However, the invention may have other applications where it is necessary to sense the strength of radiation from the sun. Furthermore, it is envisaged that a workable device could be designed using other types of thermochromic liquid crystal compositions—e.g. those displaying "colour play" (i.e. which change colour through the spectrum when subjected to different temperatures). Such a device would employ a number of different compositions whose colour plays from start of red to start of blue in the electromagnetic spectrum extend over overlapping temperature ranges covering the entire wide range of temperatures that the device could be heated to when subjected to heat radiation from the sun.

It will be appreciated that throughout this specification the term "thermochromic" when applied to liquid crystal compositions is intended to mean liquid crystal compositions which display different colours over a specific temperature range, which display two different colour whether above or below a specific temperature or which display a specific colour below a "clearing point" and which clear or become transparent at temperatures above the clearing point.

As various changes could be made in the above constructions and methods without departing from the scope of the invention, it is intended that all matter contained in the above description or shown in the accompanying drawings shall be interpreted as illustrative and not in a limiting sense.

I claim:

1. A device for providing a visual indication of the amount of heat radiation received from the sun at any time, comprising carrier means and a plurality of discrete display areas on the carrier means each comprising a different heat activatable liquid crystal composition arranged to receive heat radiation from the sun, the liquid crystal compositions being activated to change their appearance in response to different relatively narrow temperature ranges within a wide temperature range that the liquid crystal compositions would be expected to be heated to when the device is exposed to heat radiation from the sun, a quantitative visual indication of the strength of heat radiation being received from the sun being provided by the actuation of display areas in dependence on the narrow temperature ranges that corresponding liquid crystal compositions respond to when heated by the sun within said wide temperature range.

2. A device according to claim 1, characterised in that there is provided at least one U.V. filter for filtering the U.V. radiation from the sun radiation to prevent or reduce degradation of the liquid crystal composition by U.V. radiation.

3. A device according to claim 1, characterised in that the liquid crystal compositions are selected so that said wide temperature range includes the range from at least 25° C., e.g. 30° C., to at least 80° C., e.g. 90° C., and is at least 50° C., e.g. 60° C., wide.

4. A device according to claim 1 characterised in that the liquid crystal compositions are encapsulated and are printed on the carrier means as inks in layers of less than 25 μm.

5. A device according to claim 1 characterised in that the liquid crystal compositions have a low temperature dependence of colour but have different clearing points, the liquid crystal compositions displaying substantially the same colour when viewed in sunlight and when at temperatures below their respective clearing points.

6. A device according to claim 5, characterised in that the liquid crystal compositions are applied in layers in the form of numerals, the numerals being selected in such a manner that the display areas display different sun screening factor numbers for different strengths of heat radiation sensed.

7. A device according to claim 1, characterised in that the carrier means is provided with a background of a colour to influence the thermal efficiency of the system.

8. A sun-tan factor meter according to claim 1 wherein the respective display areas have a configuration of Roman numerals.

9. A sun-tan factor meter for measuring the heat radiation received from the sun, characterised in that the meter comprises a plurality of display areas on carrier means, each display area comprising a different heat radiation activatable liquid crystal composition arranged on a carrier to receive the heat radiation from the sun, and the layers having the form of numerals selected so that the display areas display different sun tan factor numbers for different strengths of the heat radiation received from the sun.

10. A sun-tan factor meter according to claim 9 in combination with a first container containing sun screening lotion in concentrated form and a second container containing a diluent for diluting the concentration of the concentrated sun screening lotion to enable adjustment of the sun factor number thereof, and wherein said carrier means are firmly applied to one of the first and second containers.

11. A sun-tan factor meter according to claim 9 in combination with a container for skin-applicable sun-screening substance, and wherein said carrier means are firmly connected to said container.

12. A combination according to claim 11 in which the sun tan factor meter is applied to, a lid or cap of the container.

* * * * *